(12) United States Patent
Köhler et al.

(10) Patent No.: US 9,953,198 B2
(45) Date of Patent: Apr. 24, 2018

(54) SYSTEMS AND METHODS FOR A CLOUD CONNECTED TRANSPONDER

(71) Applicant: SMARTRAC TECHNOLOGY GmbH, Dresden (DE)

(72) Inventors: Jens Köhler, Dresden (DE); Jan Konrad Bauer, Dresden (DE); Jason Robert Weiss, Lunenburg, MA (US)

( * ) Notice: Subject to any disclaimer, the term of this patent is extended or adjusted under 35 U.S.C. 154(b) by 0 days.

(21) Appl. No.: 14/964,480

(22) Filed: Dec. 9, 2015

(65) Prior Publication Data

US 2017/0169263 A1    Jun. 15, 2017

(51) Int. Cl.
*G06K 7/10* (2006.01)
*H04L 29/08* (2006.01)

(52) U.S. Cl.
CPC .......... *G06K 7/10386* (2013.01); *H04L 67/10* (2013.01)

(58) Field of Classification Search
CPC ................ G06K 7/10396; H04L 67/10; H04L 2209/805; G06Q 20/327; G06Q 20/3278
See application file for complete search history.

(56) References Cited

U.S. PATENT DOCUMENTS

| 5,640,052 | A | 6/1997 | Tsukamoto |
| 8,997,081 | B1 | 3/2015 | Manion et al. |
| 2001/0054771 | A1 | 12/2001 | Wark et al. |
| 2004/0183182 | A1 | 9/2004 | Swindlehurst |
| 2004/0197979 | A1 | 10/2004 | Se-Young |
| 2005/0234778 | A1* | 10/2005 | Sperduti ................ G06Q 20/20 705/22 |
| 2006/0277467 | A1* | 12/2006 | Reponen ................ G06F 3/011 715/708 |
| 2007/0156545 | A1* | 7/2007 | Lin ..................... G06Q 10/087 705/28 |

(Continued)

FOREIGN PATENT DOCUMENTS

| CN | 101295692 A | 10/2008 |
| DE | 101 57 205 A1 | 6/2003 |

(Continued)

OTHER PUBLICATIONS

PCT International Search Report dated Feb. 3, 2014 for PCT/DE2013/000451, 8 pages.

(Continued)

*Primary Examiner* — Kabir A Timory

(57) ABSTRACT

A system comprising a server configured to store a plurality of storage formats associated with one or more auto-identification technologies transponders; and a mobile device comprising: a plurality of application configured to handle auto-identification data, a communication interface, a reader circuit configured to implement at least one auto-identification protocol, a processor configured to implement operating system instructions, the operating system instructions configured to cause the processor to: receive context data, receive auto-identification data from the reader circuit, send at least some of the auto-identification data and the context data to the server via the communication link, receive one of the plurality of storage formats via the communication link that was selected based on the auto-identification data and the context data, and identify and launch one of the plurality of applications based on the received storage format.

38 Claims, 6 Drawing Sheets

200

Processing Stream

(56) References Cited

U.S. PATENT DOCUMENTS

| | | | |
|---|---|---|---|
| 2008/0295318 A1 | 12/2008 | Bohn | |
| 2008/0320377 A1* | 12/2008 | Seetharamakrishnan | G06F 17/30011 |
| | | | 715/200 |
| 2010/0134289 A1 | 6/2010 | Oh et al. | |
| 2012/0088487 A1 | 4/2012 | Mohammad | |

FOREIGN PATENT DOCUMENTS

| | | |
|---|---|---|
| DE | 10 2005 012496 B3 | 10/2006 |
| JP | 2000-114314 A | 4/2000 |
| JP | 2005-197488 A | 7/2005 |
| JP | 2006-310477 A | 11/2006 |
| WO | 00/048242 A1 | 8/2000 |

OTHER PUBLICATIONS

Kim, J.H. et al., "Soldering Method Using Longitudinal Ultrasonic," IEEE Transactions on Components and Packaging Technologies, IEEE Service Center, Piscataway, N.J., U.S. vol. 28, No. 3, Sep. 1, 2005. ISSN 1521-3331.

English Language Translation of the PCT International Preliminary Report on Patentability PCT/DE2013/000451, dated Feb. 19, 2015, 13 pages.

PCT International Search Report and Written Opinion for PCT/IB2016/057342 dated Feb. 24, 2017, 10 pages.

State Intellectual Property Office of People's Republic of China, First Office Action and Search Report, Application No. 201380042531.0, dated Nov. 28, 2016.

\* cited by examiner

SYSTEMS AND METHODS FOR A CLOUD CONNECTED TRANSPONDER

BACKGROUND

1. Technical Field

The embodiments described herein are related to interfacing with products and other items to obtain data related to the item, and more specifically to systems and methods for determining what application to use in conjunction with data read from an Radio Frequency Identification (RFID) transponder.

2. Related Art

There are several technologies that can be associate with, e.g., a product or item in order to provide information related to the item. For example, bar codes, QR codes and RFID transponders can be placed on or attached to the product or item. Specifically, passive RFID transponders or "tags" are often attached to or embedded in objects like clothing, product packaging, paper, and the like in order to uniquely identify each "tagged" item. RFID tags typically include a small amount of memory that permit a data payload to be stored inside of the tag. These RFID tags also often provide a locking mechanism to prevent tampering by physically prohibiting any future write operations against the data payload stored on the tag. Once an RFID tag is written and its payload is locked, updates are no longer physically possible to the tag's payload.

An RFID system comprises one or more tags or transponders that are as noted, somehow associated with an object or objects, and one or more readers or interrogators configured to read information out of the tag. The reader reads information by broadcasting a Radio Frequency (RF) signal over certain range and frequency. When a tag is within range of the reader and receives the signal, it can reflect that signal back to the reader in order to communicate with the reader. In order to communicate, the reader may put certain commands on the RF signal, and the tag can respond by putting information stored in the tag onto the signal that is reflected back to the reader.

RFID systems can employ various types of technology including active technology, semi-active technology and passive technology. Active and semi-active systems include a battery within the tag. In passive systems, no battery is included in the tag. Rather, the tag receives all the energy it needs from the received RF signal. Because passive tags do not include a battery, they can be made smaller, are less expensive than active or semi-active tags, and can also provide much more flexibility to design tags to meet various application and environmental requirements. While passive tags typically cannot communicate over as long a distance, the size, cost, and flexibility provided by passive tags make them much more attractive for many applications.

RFID systems can also operate over many frequency ranges and in accordance with several communication protocols. A couple of the most common frequency ranges are the High Frequency (HF) band (13.56 MHz) and Ultra-High Frequency (UHF) band (865-928 MHz). HF systems can operate over shorter ranges, e.g., 10 cm-1 m, and at lower data rates, whereas the UHF systems can operate over longer ranges 1-12 m, and at higher data rates.

Near Field Communication (NFC) systems are examples of HF systems. NFC is a set of standards for smartphones and similar devices to establish radio communication with each other by touching them together or bringing them into proximity, usually no more than a few inches. Present and anticipated applications include contactless transactions, data exchange, and simplified setup of more complex communications such as Wi-Fi. Communication is also possible between an NFC device and an unpowered NFC chip in a tag.

NFC standards cover communications protocols and data exchange formats, and are based on existing radio-frequency identification standards including ISO/IEC 14443 and FeliCa. The standards include ISO/IEC 18092[4] and those defined by the NFC Forum, which was founded in 2004 by Nokia, Philips and Sony, and now has more than 160 members. The Forum also promotes NFC and certifies device compliance. It fits the criteria for being considered a personal area network.

NFC builds upon RFID systems by allowing two-way communication between endpoints, where earlier systems such as contact-less smartcards were one-way only. NFC devices can also be used in contactless payment systems, similar to those currently used in credit cards and electronic ticket smartcards, and allow mobile payment to replace or supplement these systems. For example, Google Wallet allows consumers to store credit card and store loyalty card information in a virtual wallet and then use an NFC-enabled device at terminals that accepts, for example, MasterCard PayPass transactions. The NFC Forum also promotes the potential for NFC-enabled devices to act as electronic identity documents and keycards. As NFC has a shorter range and supports encryption, it is generally better suited than earlier, less private RFID systems for exchanging sensitive data such as personal finance and identification.

While there are many uses for HF technologies such as NFC, UHF technologies typically support longer range communication and higher data rates. Thus, UHF technology tends to excel in applications that include but is not limited to tolling and electronic vehicle registration, asset supervision, and supply chain management Thus, the ISO/IEC 14443 standard, for example, defines the transmission protocol that allows the tag and the reader to effectively communicate back and forth. Per the standard, a sequence of transmitted radio instructions from the reader to the tag instructs the tag to either read data off the tag or, if the tag isn't locked, write data on the tag.

In the case of, e.g., NFC tags, an additional standard exists that sits atop of the ISO/IEC 14443 standard. The NFC Data Exchange Format (NDEF) technical specification describes a "storage format" that enables and supports the writing of multiple, possibly unrelated, records to the RFID tag. NDEF is but one example of complimentary storage format specification that sit on top of the lower level communications protocol, e.g., ISO/IEC 14443, being implemented. For example, GS1 is an industry consortium that has defined an open standard storage format known as the Electronic Product Code (EPC). The open source EPC storage format specification for RFID tags targets those tags typically designed to operate in the UHF frequency band, in contrast to NFC tags designed to work in the HF frequency band.

Popular operating systems, such as Google's Android operating system, provide intrinsic support for working with RFID tags. These various operating systems engage an RFID reader subsystem using the ISO/IEC 14443 transmission protocol. When the subsystem reads data off of the RFID tag, it is handed back to the operating system in its "raw" form. It is the responsibility of the operating system to know how to translate the data packets based on the tag's specific storage format, like NDEF or EPC. Once the "raw" packets are interpreted per the storage format specification, the operating system makes a so-called routing determination.

A "routing determination" is a decision tree that identifies which single application installed on the operating system should be handed the RFID tag and its data payload for further application-specific processing. When no application on the operating system is actively in focus and running in the forefront, the decision trees of the operating systems are well documented to base a routing determination using the first record read off the tag. This approach simplifies the decision for the operating systems; they do not need to deal with any conflict resolution should multiple applications simultaneously ask to be brought to the forefront to process the application.

In cases where a focus conflict cannot be resolved automatically by the operating system, the end user of the device is typically presented with an option to determine which single application they want to be given the RFID tag and its data payload for application specific processing.

FIG. 1 is a block diagram illustration a conventional RFID transponder/reader system 100. As can be seen, system 100 can comprise a RFID transponder 102 that is configured to implement a particular communication protocol, such as ISO 14443, and a particular storage format, such as NDEF or EPC. A device 105 can comprise a RFID reader 104 configured to read data out of the tag using the communication protocol, and then provide the data to the Operating System (OS) 106. An RFID routing subroutine 107, which can be configured to implement the routing determination decision tree in order to select one of application 108-110 for handling the data. Application 108-110 can for example comprise one or more browser applications and one or more custom applications.

A conventional OS 106 attempts to automatically interpret and route an RFID tag event, or it defers to the end user of the device to make a selection when multiple applications 108-110 express simultaneous interest in a single RFID tag based on the first record read off the tag. The problem with this approach is that an application is only given the ability to express its interest in receiving the event based on the first record of data interpreted by the operating system. In most business applications, especially considering the preponderance of applications installed on today's mobile devices that are capable of providing application-specific processing of RFID tag data, this is a major limitation.

Similar data handling can occur for, e.g., data from a barcode or QR code.

SUMMARY

Systems and methods for virtualization of the storage format found on RFID transponders based on a plurality of factors that exist at the time the RFID transponder is interrogated by an RFID reader are described herein.

According to one aspect, a system comprising a server configured to store a plurality of storage formats associated with one or more auto-identification technologies transponders; and a mobile device comprising: a plurality of application configured to handle auto-identification data, a communication interface, a reader circuit configured to implement at least one auto-identification protocol, a processor configured to implement operating system instructions, the operating system instructions configured to cause the processor to: receive context data, receive auto-identification data from the reader circuit, send at least some of the auto-identification data and the context data to the server via the communication link, receive one of the plurality of storage formats via the communication link that was selected based on the auto-identification data and the context data, and identify and launch one of the plurality of applications based on the received storage format.

According to another aspect, a mobile device comprises a plurality of application configured to handle auto-identification data, a communication interface, a reader circuit configured to implement at least one auto-identification protocol, a processor configured to implement operating system instructions, the operating system instructions configured to cause the processor to: receive context data, receive auto-identification data from the reader circuit, send at least some of the auto-identification data and the context data to a server via the communication link, receive one of the plurality of storage formats via the communication link that was selected based on the auto-identification data and the context data, and identify and launch one of the plurality of applications based on the received storage format.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
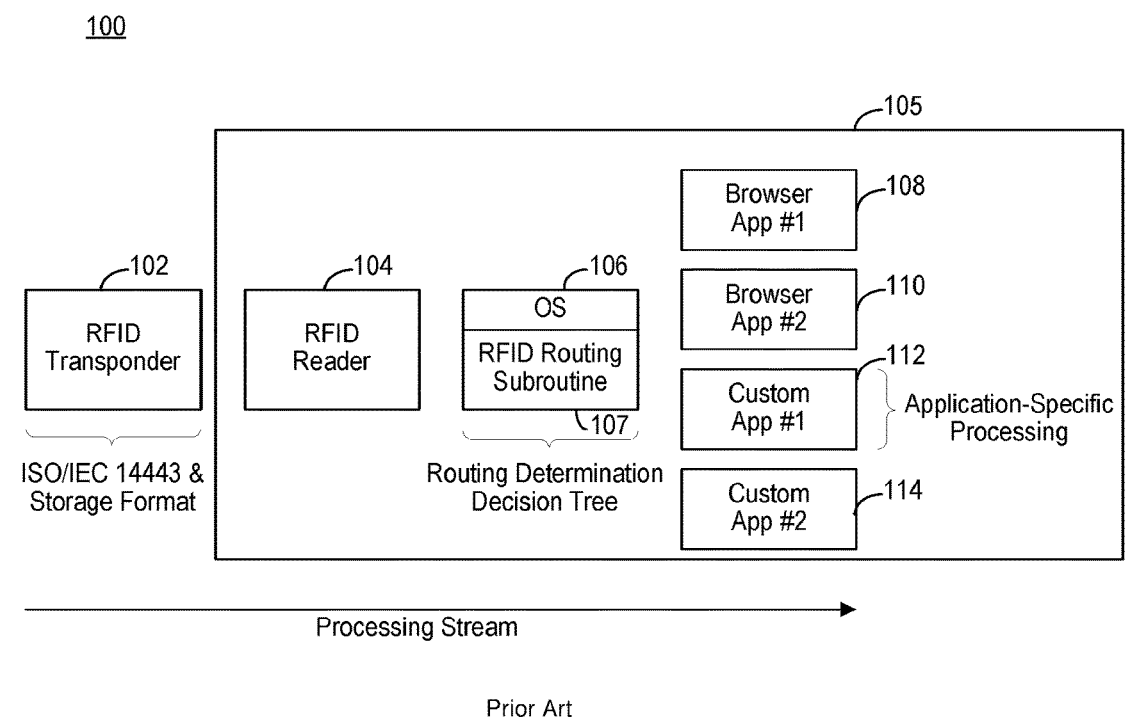
FIG. 1 is a block diagram illustrating a conventional RFID transponder/reader system.

In the embodiments described herein, systems and methods for the virtualization of the storage format found on, e.g., RFID transponders based on a plurality of factors, such as temporal, physical, and/or environmental factors that exist at the time the RFID transponder is interrogated by an RFID reader are disclosed. As described with respect to the following embodiments, dynamic generation of the RFID transponder data payload within an RFID interpreter, which can be part of the OS and connected to RFID reader, enables more precise routing determinations by operating systems without violating the existing RFID tag transmission protocols, widely published and adopted routing determination decision trees used by operating systems, and the standards related to storage formats for RFID tag data payloads.

For example, consider an RFID tag encoded with two records, the first of which is a simple URL pointing to a marketing web site and the second of which is a proprietary product identification record, pointing to content located in some remote database, e.g., in the cloud. Device 105, which can, e.g., be a smart phone, can comprise four applications 108-114 each capable of providing application-specific processing of RFID tag data:

1. Chrome Browser (108);
2. FireFox Browser (110);

3. Field Management app (112); and

4. Administrative app.

When OS 106 attempts to resolve which application 108-112 should receive the RFID tag data, it broadcasts notice to all installed apps on device 105 that it read a record from an RFID tag that contained a URL. In transmitting this broadcast, OS 106 completely ignores any records 2 thru n defined on the RFID tag 102. In this illustrative example with the URL record, only the 2 web browser applications 108 and 110 respond in a positive way asking to receive the event or data. Since OS 106 isn't sure which browser application to dispatch the RFID tag data to for further application-specific processing, the end user is prompted to pick between the two different browser applications 108 and 110. OS 106 then forwards along the URL for application-specific processing to whichever browser the user picks. The browser application will then, in this example, fetch and render the Web page located at the URL defined on tag 102.

But consider where the device 105 includes and is able to operate in conjunction with Location Based Services (LBS). It would then, e.g., be possible to determine that the end-user is in the field working on a remote system and therefore the URL is actually unimportant, whereas it is the data in one or more records 2-n that is important. Thus, e.g., the only application that should receive the RFID tag data is the Field Management application 112. Unfortunately, in conventional systems, since the record format on the tag was physically locked, and the first record was a URL, this Field Management application 112 will not even presented to the user as an option.

Instead, in such a scenario within an conventional system, the end user is expected to cancel the browser application selection dialog, know to open up the correct application (i.e. the Field Management app 112), and then cause the reader 104 to interrogate the RFID tag 102 again. Since the Field Management app 112 is in the forefront and has focus, it will now automatically be given the so-called right of first refusal by the operating system. Thus, for example, where multiple applications are installed on the device, these various factors can be used, alone or in combination to determine which application receives the data. In fact, the list of applications can be used as a factor in determining which application receives the data.

But in the systems and methods described herein, information such as location can be used to adjust the routing decision tree. Other factors can also be considers, such as environmental conditions, e.g., level of humidity, temperature, air pressure, vibrations; physical conditions such as the type of device; the authenticated user logged into the device; geospatial conditions; and even temporal decisions, e.g., based on time of day and day of week.

Figure 2:
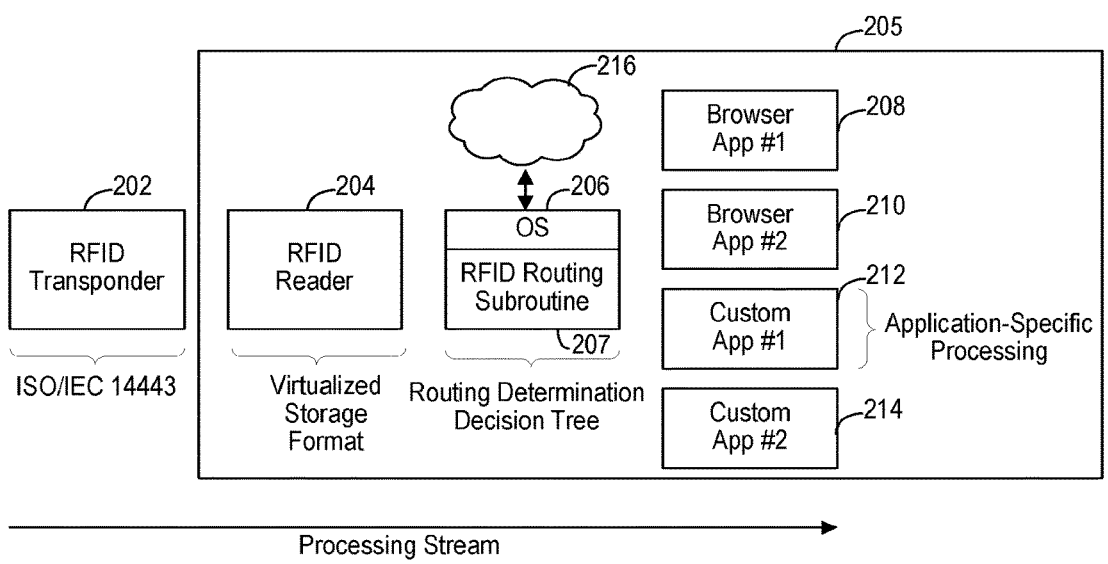
FIG. 2 is a diagram illustrating an example system configured in accordance with one example embodiment.

FIG. 2 is a diagram illustrating an example system 200 configured in accordance with one example embodiment. In system 200, OS 206 is configured to interface with, e.g., the cloud 216 and transponder 202 is configured to implement a communication protocol, but not necessarily a particular storage format. Rather, a plurality of storage formats that can be used to handle the data stored on transponder 202 can be stored remotely, e.g., in cloud 216. Now, when reader 204 reads the raw data from tag 202 and passes it to OS 206, OS 206 can be configured to reach out to the cloud 206 to retrieve the correct storage format for the data so that the routing subroutine 207 has the requisite information to make a correct routing decision.

The correct storage format can depend on several factors, such as those listed above. Thus, in the prior example, OS 206 can be configured such that when it reaches out to the cloud to determine the correct storage format, the location of the end user can be used to indicate that the url is not important, but rather the data of one of the other records 2-n is important. The storage format for this other record can then be retrieved by OS 206 and used by routing subroutine 207 to select the correct application 208-214.

Thus, system 200 can use a variety of factors to determine what storage format to use, where each combination of factors results in a different so-called "virtualized storage format" available to OS 206 for handling data retrieved from transponder 202. For example, if the device 205 is within a geospatial bounding box and the day of the week is Monday through Friday between the hours of 0700 and 1000, then the virtualized storage format should be NDEF with two records in this specific sequence, [URL, Proprietary Record]. If the hours are between 1001 and 2000, the virtualized storage format should be NDEF with the two records presented in this sequence, [Proprietary Record, URL]. Furthermore, outside of these two conditions, the virtualized storage format should be EPC with a valid product code presented to the RFID interpreter.

Depending on the embodiment, the logic needed to determine what factors to use when selecting the correct storage format can reside remotely, i.e., in cloud 216, on device 205, or both. For example, FIG. 3 is a block diagram illustrating an example system 300 configured in accordance with another example embodiment, wherein device 205 comprises an enhanced RFID interpreter 318 (module of OS) that is capable of gathering context from the OS 306, joining it with minimal RFID tag data, e.g., comprising the RFID tag's unique ID (TID) and security features, like digital signatures to prove authenticity, and forwarding this data to the cloud 316 with a request for a virtualized storage format representation.

In the system 300, when data is read form transponder 302 by reader 304, the data is passed to interpreter 318, which also receives context data from OS 306. This context data can be based on all of the factors described above. Interpreter 318 can be configured to then take the TID, context data, and any required security features and send them to the cloud 316. The cloud, 316, or more specifically some application running on a server within the cloud 316 can then take the data provided by interpreter 318 and determine the correct storage format based on the TID and the context.

The application can then return the correct, e.g., NDEF to be used by the routing subroutine, which can be part of interpreter 318 or separate, to determine the correct application 308-314 to use for handling the data read from transponder 302.

Figure 3:
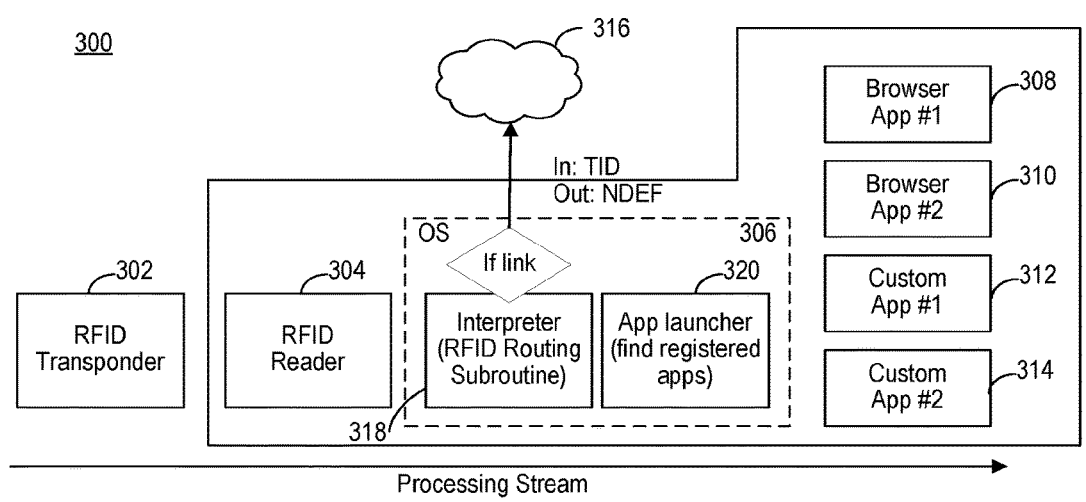
FIG. 3 is a block diagram illustrating an example system configured in accordance with another example embodiment.

In the example of FIG. 3, an application launcher 320 can be included and configured to take application information, determined based on the storage format returned from, e.g., the cloud 316, provided by the routing subroutine included interpreter 318 and based thereon bring the correct application 308-314 to the fore for handling the data retrieved from transponder 302.

Now consider the example where an RFID tag is placed on pool chemicals that are sold through a retail location. The tag can have an identifier that is associated with the product. When a consumer enters the retail location, they can read the tag, e.g., using an NFC reader 304 within their smart phone (device 305). Interpreter 318 can receive the tag information, most specifically the identifier, as well as context information. The context information can include the time of day, which would indicate that the tag is being read during business hours; location information, which would indicate the consumer is in the retail location; and possibly other information such as information indicating that the pool chemicals are still in inventor at the retail location; and information identifying the consumer.

Interpreter 318 can then send the tag and context information to the cloud, which can determine that the user is in the store and interested in purchasing the pool chemicals. This can cause the cloud 316 to return, e.g., a url for information on the chemicals or a url for the retail location as well as a storage format indicating that the information is a url and that a browser application should be launched.

This can cause app launcher 320 to launch one of browser applications 308 or 310, or it can cause app launcher 320 to prompt the user to choose one of browser application 308 or 310. The consumer can then access information such as price, comparable products, etc.

Alternatively, one of applications 312 or 314 can be an application associated with the retail location. The storage format, can in such an instance instruct the routing subroutine and app launcher 320 to launch the retail location specific application through which the consumer can get further information on the pool chemicals.

Once the consumer takes the pool chemicals home, they may want to know, e.g., how often to use the chemicals, how much to use, etc. The consumer can now read the same tag using their smartphone device 305. Now interpreter 318 can receive context information indicating that the user is not at the retail location. This can cause interpreter 318 to receive storage format information that will cause the routing subroutine and app launcher 320 to launch a browser application or custom application that can provide the consumer with information on how to use the chemicals.

Now consider that a fire breaks out at the consumer's home. The firefighters that respond can have devices 305 that will indicate to interpreter 318 that the information read from the tag is being read by a firefighter. This can cause interpreter 318 to receive storage information that will cause the routing subroutine and app launcher 320 to launch a browser or custom application that can provide the firefighter with safety information for the chemicals, i.e., in the event of fire do or do not apply water, as opposed to powder or foam, etc.

Thus is it can be seen that using the cloud based system of FIG. 3 and virtual, dynamically generate storage format methods the same tag can provide different context specific information through different applications 308-314.

Figure 4:
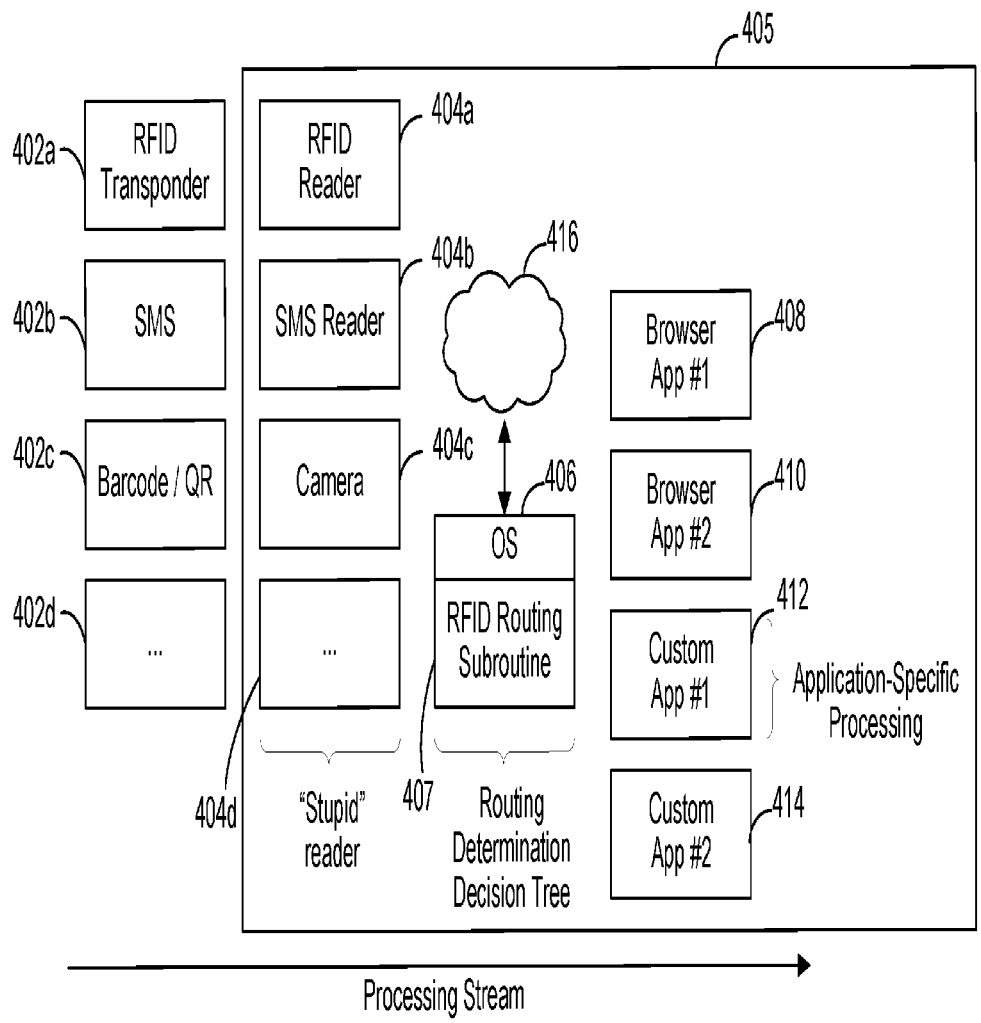
FIG. 4 is a block diagram illustrating an example system configured in accordance with another example embodiment.

FIG. 4 is a block diagram of an example system 400 configured in accordance with one embodiment that illustrates that the systems and methods described herein can be extended to multiple types of "tags" 402 and readers 404. Essentially, any device or technology that can provide identifying, and possibly other information to a reader can benefit from the systems and methods described herein. Such devices can include barcodes, QR codes, or other types of RFID tags, such as UHF tags. For example, if the data stored on a QR code integrates a unique ID, then the ID can be used to determine the data to be processed and the application to be used therewith.

As described, the virtualization of the storage format can take place within the RFID interpreter module 318, leaving the physical structure of the RFID transponder 302, the routing determination decision tree algorithms that so many production applications depend upon today, and widely adopted storage formats layered on top of ISO/IEC 14443 intact and unaffected. In short, the virtualization of the storage format layer, retrieved from the Cloud 316 based on a context from environmental, physical, and temporal factors can enable the OS 306 to yield a much more precise routing determination without requiring a priori knowledge by the end user of the device 305.

It should be noted that the old, non-virtualized storage formats can still be supported. For example, the OS 306 can include a "switch" that can be activated by the user, or based on certain contextual information, or the lack thereof, to cause the routing subroutine to follow the conventional processing, or to use virtualized storage formats as described herein.

Thus, the architecture illustrated, e.g., in FIG. 3 can support a backwards-compatible implementation regardless of technology being used that manages to provide new contextual application routing, reduce end user training requirements around which application to use when and where, and create new types of user experiences not presently possible under the current state-of-the-art.

The systems and methods illustrated herein can be extended to the new NFC forum extension "tdn://," which stands for Tag Delivery Network (TDN), to specify the "pointer" to allow app registration (for backward compatibility). In case of an OS with TDN support it will be interpret and replace the "tdn"—pointer with the cloud provided TDN message, before sending information to the app launcher 318.

In case of an OS 306 without TDN support (old versions), an additional application is required. In certain embodiments, there is an application that is registered for tdn messages and translates the "tdn" message and injects another NFC message to the OS 306. The OS 306 will start the normal workflow and execute the other app.

For example, there can be an NFC tag to download an application: In case of a Blackberry OS, the NDEF message provider creates and NDEF with an URL which points to the Blackberry store. In case of an Android OS, the NDEF message provider creates and NDEF with an URL which points to the Google Play store.

Figure 5:
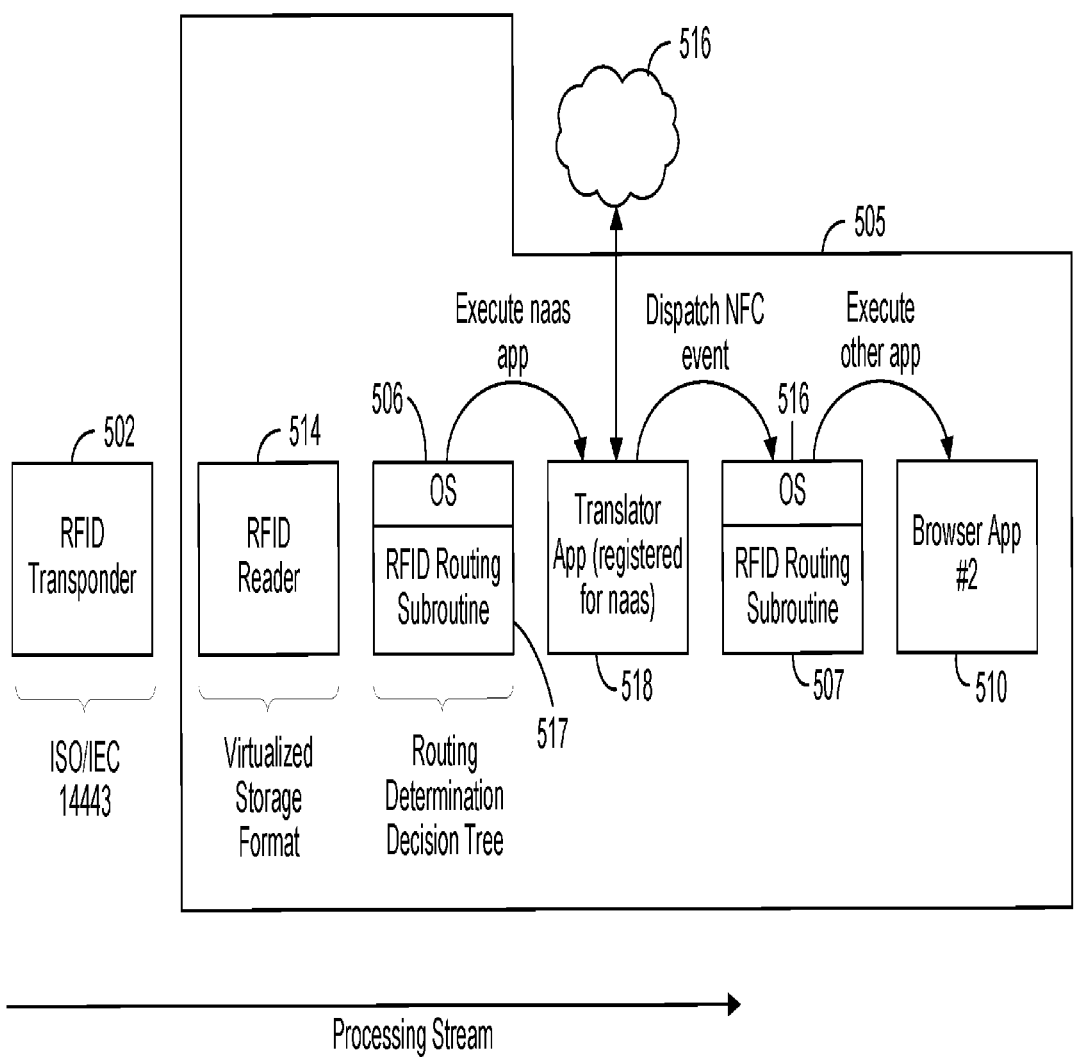
FIG. 5 is a block diagram illustrating an example system configured in accordance with another example embodiment.

FIG. 5 is a block diagram of an example system 500 configured with TDN translation in accordance with one embodiment. In this example embodiment, translator application 528 can provide the TID rad from tag 502 to the cloud and receive a binary stream (NDEF) with content type "TDN". The translator app 318 can then dispatch and NFC event based thereon to the subroutine 507, which will cause the subroutine 507 to, e.g., launch a browser application 510.

Alternatively, in certain embodiment, the OS only reads the tag content (NDEF) and not the tag identifier (TID). The tag identifier can be integrated in the NDEF but it can be also some other unique tag identifier. In such embodiments, the OS interprets the tag content (NDEF) and searches for a registered OS sub routine. If this is not successful, i.e., no sub routine is found, then the OS can search for a registered application for the associated protocol ("tdn"). An OS sub routine is typically integrated in OS, e.g. Android, whereas an application is external, e.g., installed from Google playstore.

If the NDEF receiver (translator) is found (OS sub routine or app) the OS sends the tag content and the NDEF receiver, which calls the cloud based content provider (tag delivery network). The endpoint/server can be included in the original TDN record or, depending on the embodiment, integrated in the NDEF receiver (OS sub routine/app).

A "TDN record" could looks like
    Format: "tdn://{url}"
    tdn=protocol
    url=url server/pointer+parameters (e.g. tid or other unique identifiers)

Samples:

"tdn://profiles.smartcosmos.com?id=adVKJE13fd3A"
"tdn://
profiles.smartcosmos.com?id=adVKJE13fd3A&token=
3456"
"tdn://default?id=adVKJE13fd3A&token=123456"
"tdn://default?tagid=E2801130200035790DD6088D"

The cloud based content provider (tag delivery network) responds with a binary stream (NDEF) to the translator. In the case of redirection, this response is typically a no content type "NAAS" or "TDN" as noted below:

Standard case: TDN→→{standard NDEF like "open URL" or "launch APP"}; and
Redirection case: TDN→[1 . . . n TDN]→{standard NDEF like "open URL" or "launch APP"}.

The translator injects the received NDEF back to the OS for future actions. The following is a sample workflow for 1-TDN-URL:

Tag encoding "tdn://server1.com/adVKJE13fd3A";
OS found registered translator for "tdn";
Translator received binary stream (NDEF with "http://www.smartrac-group.com") from cloud based content provider located at "server1.com" (tag delivery network); Translator injects the NDEF to the OS; and
OS found registered app for "http"→browser.

The following is a sample workflow for 2-TDN-TND-URL (redirection):

Tag encoding "tdn://server1.com/adVKJE13fd3A";
OS found registered translator for "tdn";
Translator received binary stream (NDEF with "tdn://server222.com/adVKJE13fd3A") from cloud based content provider located at "server1.com" (tag delivery network);
Translator injects the NDEF to the OS;
OS found registered translator for "tdn";
Translator received binary stream (NDEF with "http://www.smartrac-group.com") from cloud based content provider located at "server222.com" (tag delivery network);
Translator injects the NDEF to the OS; and
OS found registered app for "http"→browser.

Figure 6:
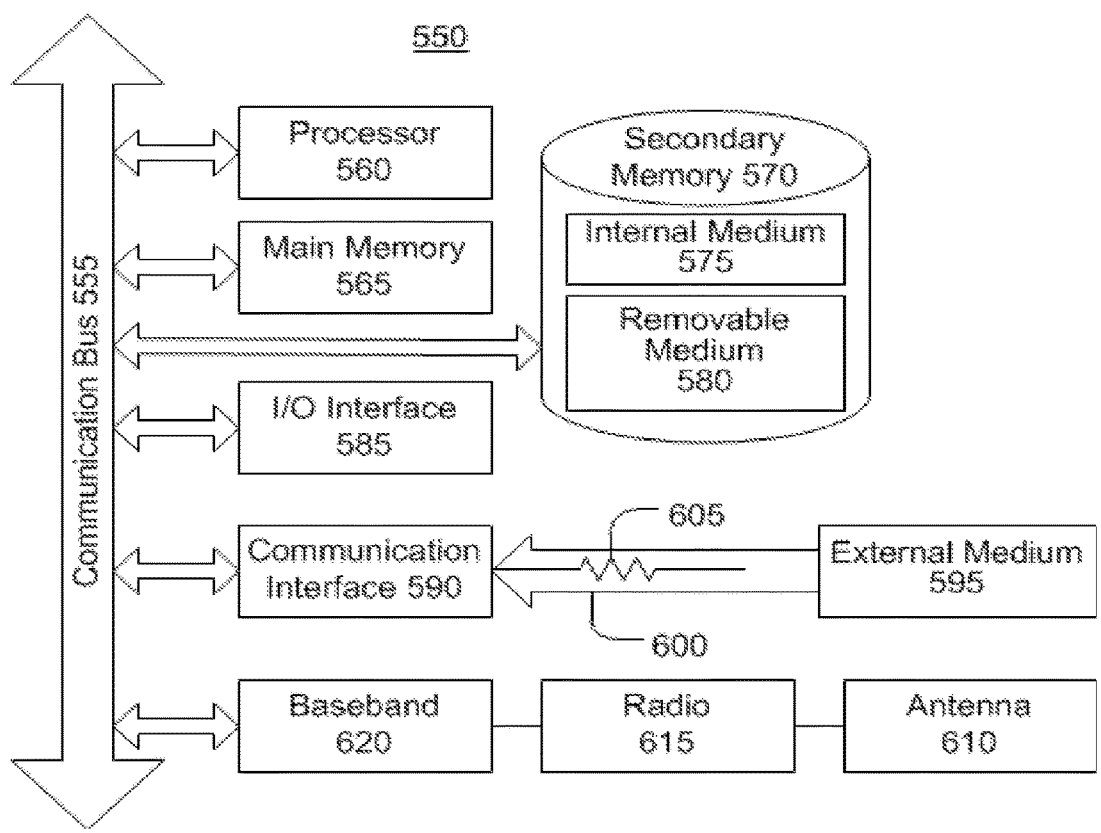
FIG. 6 is a block diagram illustrating an example wired or wireless system that can be used in connection with various embodiments described herein.

FIG. 6 is a block diagram illustrating an example wired or wireless system 550 that can be used in connection with various embodiments described herein. For example the system 550 can be used as or in conjunction with one or more of the mechanisms or processes described above, and can represent at least some of the components of the device 305, e.g., a processor configured to implement OS 306 and the various modules and applications described herein, tag 302, the corresponding backend, or cloud server(s), and/or other devices described herein. The system 550 can be a combination of one or more of the following: a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a copro-cessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A system comprising:
a server configured to store a plurality of different storage formats associated with transponders configured for used with one or more auto-identification technologies; and
a mobile device comprising:
a plurality of applications configured to handle auto-identification data,
a communication interface,
a reader circuit configured to implement at least one auto-identification protocol,
a processor configured to implement operating system instructions, the operating system instructions configured to cause the processor to:
receive context data,
wherein the context data includes a list of the plurality of applications stored on the mobile device,
receive auto-identification data from the reader circuit,
send at least the auto-identification data and the context data to the server via the communication interface,
receive one of the plurality of storage formats via the communication interface that was selected based on the auto-identification data and the context data, and
identify and launch one of the plurality of applications based on the received storage format.

2. The system of claim 1, wherein the operating system instructions are further configured to cause the processor to receive security information in the auto-identification data and to provide the security information to the server.

3. The system of claim 1, wherein the context data includes environmental conditions at a time the reader circuit reading the auto-identification data.

4. The system of claim 3, wherein the environmental conditions include level of humidity, temperature, air pressure, or vibrations.

5. The system of claim 1, wherein the context data includes physical conditions.

6. The system of claim 5, wherein the physical conditions include a type associated with the mobile device.

7. The system of claim 1, wherein the context data includes an identity of an authenticated user logged into the mobile device.

8. The system of claim 1, wherein the context data includes geospatial conditions.

9. The system of claim 1, wherein the context data includes temporal information.

10. The system of claim 1, wherein the auto-identification technology is Radio Frequency Identification (RFID), and wherein the reader circuit is an RFID reader circuit.

11. The system of claim 10, wherein the RFID reader circuit is configured to implement the ISO 14443 RFID communication protocol.

12. The system of claim 10, wherein the RFID reader circuit is configured to implement the ISO 15693 RFID communication protocol.

13. The system of claim 11, wherein the RFID reader circuit is further configured to implement the Near Field Communication (NFC) standard.

14. The system of claim 11, wherein the RFID reader circuit is further configured to implement the Electronic Product Code (EPC) standard.

15. The system of claim 10, wherein the RFID reader circuitry is configured to operate in at least one of a High Frequency (HF) band and an Ultra-High Frequency (UHF) band.

16. The system of claim 1, wherein the auto-identification data includes an identifier.

17. The system of claim 16, wherein the identifier is a Tag Identifier (TID).

18. The system of claim 16, wherein the identifier is a Unique Identifier (UID).

19. The system of claim 16, wherein the identifier is used in the selection of the storage format.

20. A mobile device comprising:
a plurality of applications configured to handle auto-identification data,
a communication interface,
a reader circuit configured to implement at least one auto-identification protocol,
a processor configured to implement operating system instructions, the operating system instructions configured to cause the processor to:
receive context data,
wherein the context data includes a list of the plurality of applications stored on the mobile device,
receive auto-identification data from the reader circuit,
send at least the auto-identification data and the context data to a server via the communication interface,
receive one of the plurality of storage formats via the communication interface that was selected based on the auto-identification data and the context data, and
identify and launch one of the plurality of applications based on the received storage format.

21. The mobile device of claim 20, wherein the operating system instructions are further configured to cause the processor to receive security information and to provide the security information to the server.

22. The mobile device of claim 20, wherein the context data includes environmental conditions.

23. The mobile device of claim 22, wherein the environmental conditions include level of humidity, temperature, air pressure, or vibrations.

24. The mobile device of claim 20, wherein the context data includes physical conditions.

25. The mobile device of claim 24, wherein the physical conditions include a type associated with the mobile device.

26. The mobile device of claim 20, wherein the context data includes an identity of an authenticated user logged into the mobile device.

27. The mobile device of claim 20, wherein the context data includes geospatial conditions.

28. The mobile device of claim 20, wherein the context data includes temporal information.

29. The mobile device of claim 20, wherein the auto-identification protocol is Radio Frequency Identification (RFID), and wherein the reader circuit is an RFID reader circuit.

30. The mobile device of claim 29, wherein the RFID reader circuit is configured to implement the ISO 14443 RFID communication protocol.

31. The mobile device of claim 29, wherein the RFID reader circuit is configured to implement the ISO 15693 RFID communication protocol.

32. The mobile device of claim 29, wherein the RFID reader circuit is further configured to implement the Near Field Communication (NFC) standard.

33. The mobile device of claim 29, wherein the RFID reader circuit is further configured to implement the Electronic Product Code (EPC) standard.

34. The mobile device of claim 29, wherein the RFID reader circuitry is configured to operate in at least one of a High Frequency (HF) band and an Ultra-High Frequency (UHF) band.

35. The mobile device of claim 20, wherein the auto-identification data includes an identifier.

36. The mobile device of claim 35, wherein the identifier is a Tag Identifier (TID).

37. The mobile device of claim 35, wherein the identifier is a Unique Identifier (UID).

38. The mobile device of claim 35, wherein the identifier is used to select the storage format.

* * * * *